May 7, 1935. L. J. TURNER 2,000,500
POWER TRANSMITTING MECHANISM
Filed Jan. 19, 1934 3 Sheets-Sheet 1
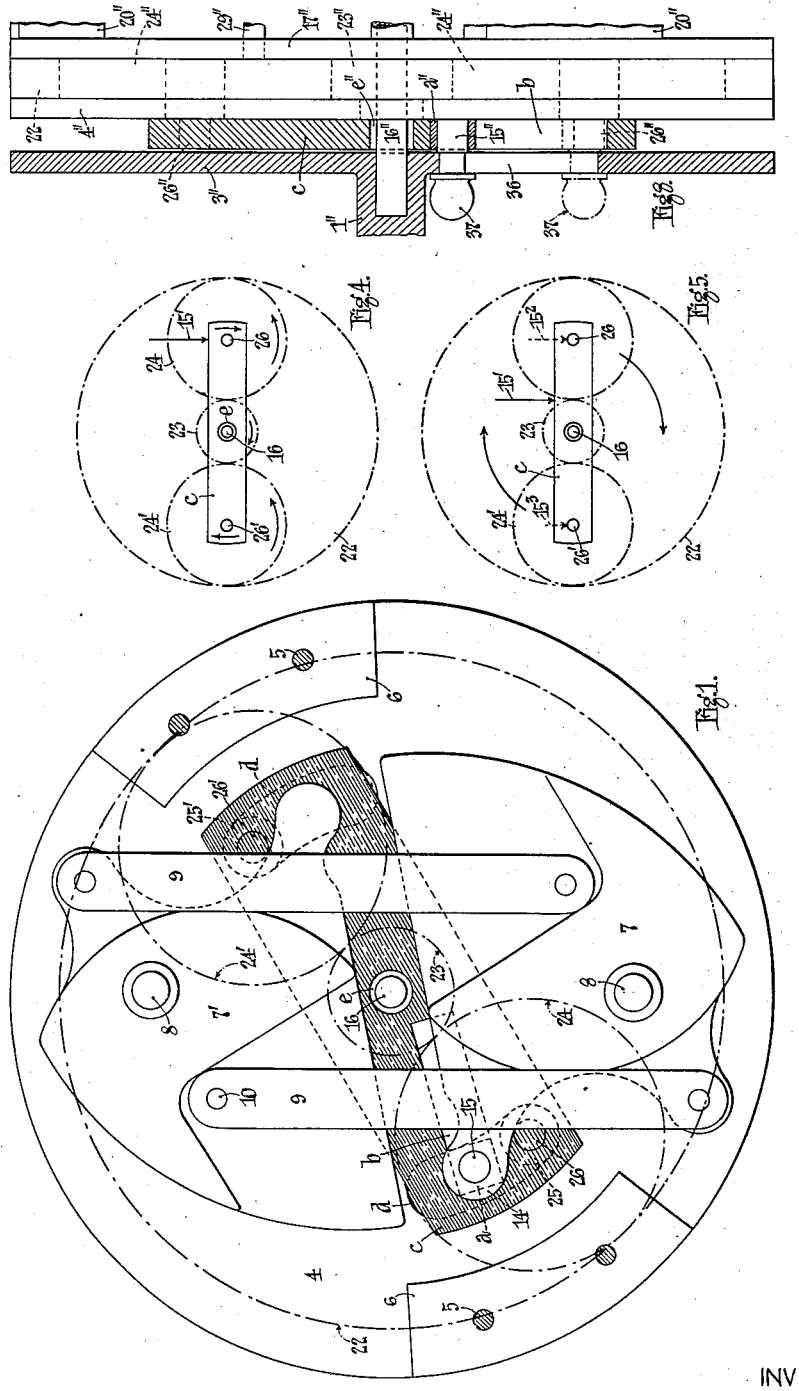
INVENTOR:
LOUIS J. TURNER.
BY Marks & Clerk
ATTORNEYS.

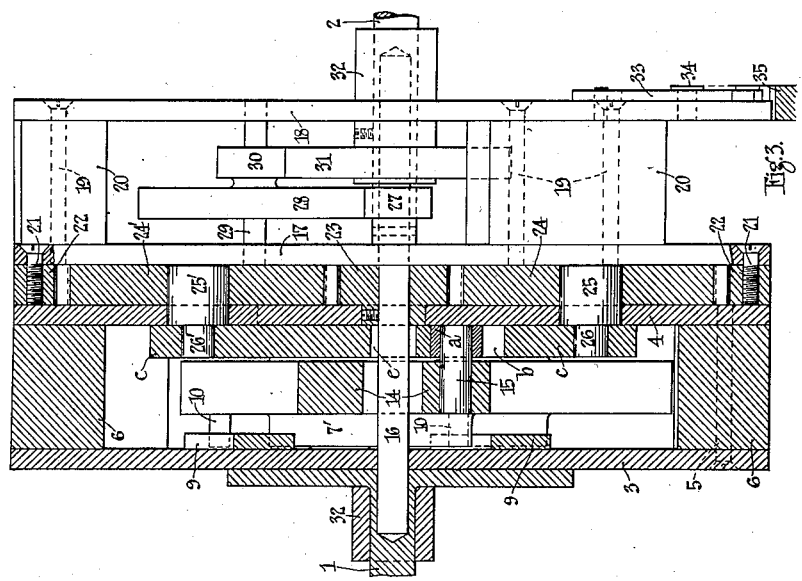
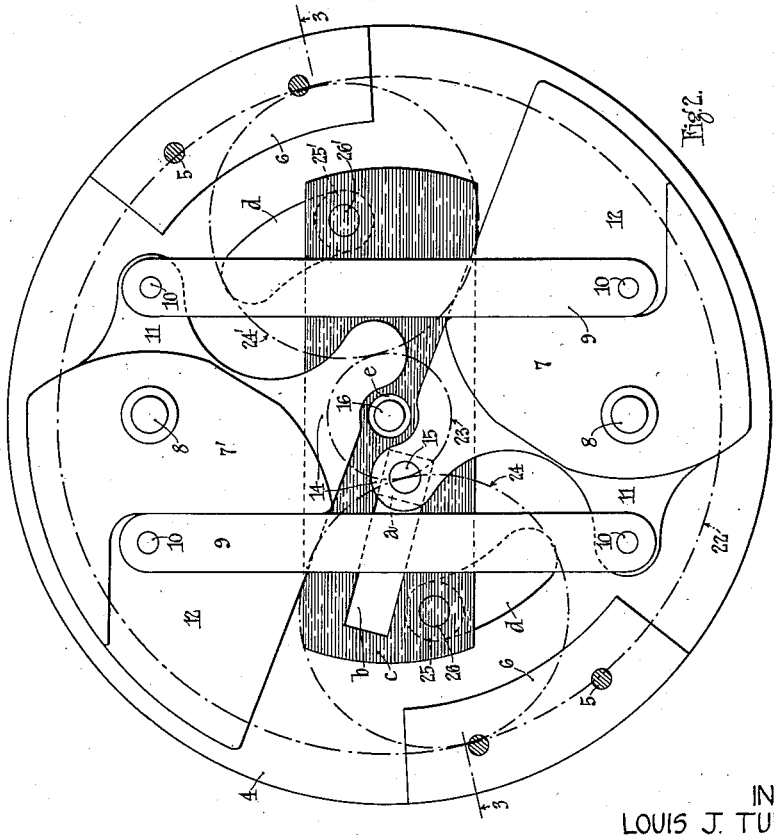
INVENTOR
LOUIS J. TURNER.

May 7, 1935.  L. J. TURNER  2,000,500
POWER TRANSMITTING MECHANISM
Filed Jan. 19, 1934   3 Sheets-Sheet 3

INVENTOR:
LOUIS J. TURNER.

BY   ATTORNEYS.

Patented May 7, 1935

2,000,500

UNITED STATES PATENT OFFICE 2,000,500

POWER TRANSMITTING MECHANISM

Louis Joseph Turner, Ottawa, Ontario, Canada

Application January 19, 1934, Serial No. 707,388
In Canada January 6, 1934

11 Claims. (Cl. 74—260)

This invention relates to power transmitting mechanism, especially for use in connection with internal combustion engines and more particularly, though not exclusively, in connection with the engines of automobiles.

The invention has for object to provide an improved variable power transmitting device which provides two or more speeds to enable the engine to develop the required power at all times, notwithstanding variations in the load.

An object of the invention is to provide a change speed mechanism of extremely simple and compact construction and great reliability and efficiency.

According to the invention readily actuated manual means or automatic centrifugally operated means are employed in conjunction with an epicyclic gear of novel construction and initially the planet wheels of the gear revolve and rotate the driven shaft at low speed, and subsequently the planet wheels become locked to the sun pinion and cause the driven shaft to be rotated at high speed.

The invention consists in the construction, combination and arrangement of parts hereinafter fully described and more particularly pointed out in the appended claims.

Referring now to the accompanying drawings which illustrate, by way of example, a convenient embodiment of the invention:

Figure 1 is an end elevation, looking from the driving end of the device towards the driven end, with the front plate or disc removed, and showing the centrifugal weights in their inner or low speed position.

Figure 6:
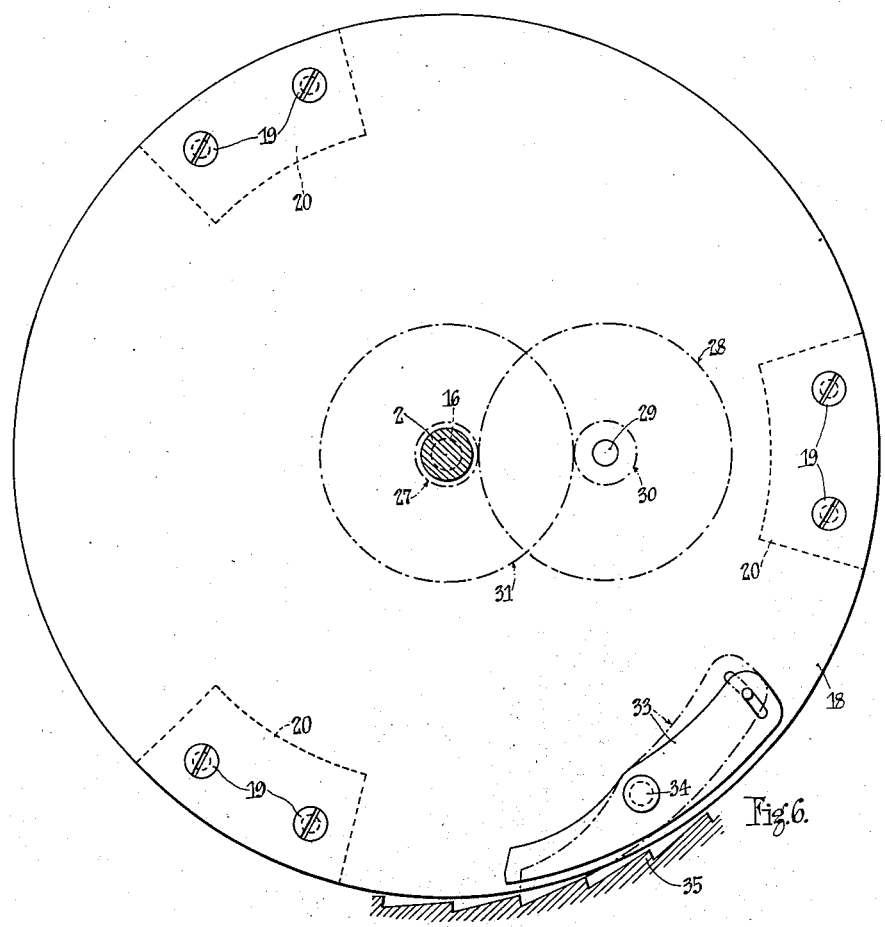
Figure 7:
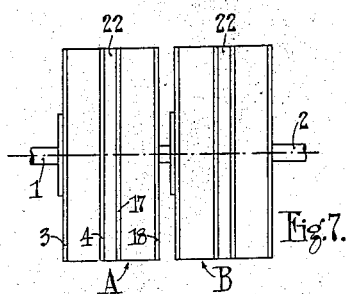

Figure 2 is a view similar to Figure 1 but showing the weights in their outer or high speed position, Figure 3 is a side elevation partially in cross section on line 3—3 of Figure 2, Figures 4 and 5 are diagrams illustrating the action of the improved gearing, Figure 6 is an end elevation looking from the driven end towards the driving end of the device, Figure 7 is a diagrammatic side elevation of a modified form of the invention, and Figure 8 is an end elevation of a modified non-automatic form of the invention.

In Figures 1 to 7 of the drawings the numerals 1 and 2 indicate the driving and driven shafts respectively. Rigidly connected to the driving shaft 1 and coaxial therewith is a housing consisting of a pair of discs 3 and 4 which are connected by any suitable means such as bolts 5 and held in spaced relation by means of blocks 6.

Between the discs 3 and 4 a pair of weights 7, 7' are pivotally mounted on shafts or trunnions 8, the axes of rotation of the weights being symmetrically located with respect to the central axis of the discs 3 and 4 and the weights being eccentrically mounted so that rotation of the housing causes them to be rocked by centrifugal action.

Preferably the weights are provided with means which will positively ensure that exactly the same rocking motion will be imparted to each weight when the housing 3—4 rotates. The means shown for this purpose comprise a pair of parallel links 9 pivotally connected to the weights at 10 on each side of the central axis of the device. Recesses 11 and 12 may be provided in the weights to accommodate the ends of the links, and one wall of each recess 12 may be designed to be engaged by the adjacent link 9 as indicated in Figure 2, and thus form a stop to limit the outward movement of the weights. Each weight is formed with a lug 14 and one of these lugs carries a stud or pin 15 which rotatably engages a bore in a block $a$ slidably mounted in a slot $b$ which is formed in a bar $c$. The bar $c$ lies between the weights 7, 7' and the disc 4 and extends diametrically across the disc.

A short shaft 16 is journalled in axial bores in the shafts 1 and 2, and rotatably mounted on the shafts 2 and 16 is a housing which comprises a pair of discs 17 and 18 rigidly connected by bolts 19 and held in spaced relation by blocks 20. Between the discs 4 and 17 and connected to the latter by screws 21 is an internally toothed ring gear 22, a closed annular chamber being thus formed between the discs 4 and 17. Mounted on the shaft 16 is a sun pinion 23, and meshing with the teeth of this pinion and the ring gear 22 are a pair of diametrically opposed planet gears 24, 24'. The planet gears 24, 24' are provided centrally with pins 25, 25' which project through arcuate slots $d$ in disc 4 and reduced portions 26, 26' of these pins fit into bores in the bar $c$. The pins 25—26 are rotatable either in the bar $c$ or the planet wheels 24 or in both. The slots $d$ are concentric with the axis of shaft 16 and an aperture $e$ is provided at the centre of the bar $c$ to form a clearance between the bar $c$ and the shaft 16.

Suitable reduction gearing is provided between the discs of the housing 17, 18. As shown, this gearing comprises a pinion 27 connected to the shaft 16 and meshing with a gear 28 which is journalled on a shaft 29 mounted in the discs 17 and 18. Connected with the gear 28 and coaxial therewith is a pinion 30 meshing with a gear 31 rigidly mounted on the driven shaft 2.

The shafts 1 and 2 are mounted in bearings indicated at 32, and the ring gear 22, sun gear 23 and planet gears 24, 24' are thus held against the disc 4 but are capable of relative rotary motion with respect thereto.

The operation of the device will now be briefly described. The normal or low speed position is illustrated in Figure 1. In this position the weights 7, 7' are in their inner position and the crank pin 15 is therefore located at the outer end of the slot b. This position is indicated diagrammatically in Figure 4 and when the driving shaft 1 is rotated the pin 15 initially applies a force to the bar c at the point indicated by the arrow 15'. The line of direction of the force 15' intersects the axis of the pin 26. The force therefore acts only on the pin 26 and produces no turning moment on the bar c. On account of the reaction of the gearing 27—31, the ring gear 22, with housing 17, 18 remains stationary or has a tendency to rotate backwardly, and while the condition shown in Figure 1 lasts the bar c does not serve any purpose. Therefore the gear 24 rolls on the ring gear 22 and rotates the planet gear 23 at low speed in the direction of the arrow. The load shaft 2 is therefore driven at low speed through the gear train 27—31, and the planet gear 24' rotates on its own axis and revolves about the sun pinion 23 in the same way as the planet wheel 24.

If an excessive load is placed on the shaft 2 the reaction in the gearing 27—31 will tend to rotate the housing 17, 18 backwardly and suitable means are provided to prevent such rotation. For example, on the disc 18 a pawl 33 may be pivoted at 34 and adapted to engage a stationary ratchet, a portion of which is indicated at 35 in Figures 3 and 6. A light spring, not shown, normally causes the tip of the pawl to project beyond the periphery of the disc 18 into engagement with the ratchet teeth 35 as indicated in dotted lines but as soon as the housing 17, 18 starts to rotate forwardly at a sufficient speed, centrifugal force acts on the tail of the pawl and withdraws the pawl from engagement with the ratchet 35.

As soon as the housing 3, 4 rotates, the weights 7 are swung outwardly on their trunnions 8 by centrifugal action and impose an inwardly directed force on the crank pin 15, and as soon as the inertia of the load on shaft 2 is sufficiently overcome, the pin 15 automatically moves inwardly to the position shown in Figure 2. In this position of the crank pin the force 15' is applied to the bar c at a point between the shaft 16 and the pin 26 as indicated in Figure 5. Force components 15² and 15³ now act on the pins 26 and 26', both forces acting in the same direction, but in view of the clearance e no force is applied to the shaft 16 by the bar c. These forces lock the planet wheels to the sun pinion and ring gear and consequently the entire apparatus rotates as a solid mass until such time as the driving force is reduced or the load is increased to such an extent that the weights return the block a and the pin 15 to the low speed position.

The slot b is preferably inclined at a suitable angle as indicated in Figures 1 and 2 so that the driving force on the pin 15 imparts to the latter a constant tendency to remain in or return to the low speed position. The device, therefore, automatically returns to low speed position when the centrifugal action of the weights decreases below a predetermined value. The weight 7' has no direct driving connection with the bar c but it acts to balance the weight 7 and to assist the latter through the links 9.

If more than two speeds are required it is merely necessary to couple together two or more devices constructed as hereinbefore described, for example as indicated in Figure 7, in which two change speed units are indicated generally at A and B. By suitably designing the weights and gearing, the device A can be caused to move to its high speed position before device B. The device A will thus provide low and medium speed, and device B, as soon as its weights move out, will provide a high speed.

It will be understood that the foregoing description and accompanying drawings are given by way of example only as that any modifications within the scope of the appended claims may be resorted to without departing from the invention.

For example, where automatic action is not required the weights, blocks 6 and bolts 5 may be omitted and the crank pin 15 actuated manually from one position to another. This form of the invention, which may be advantageously employed for various uses in machine shops and the like, is indicated in Figure 8. In this figure corresponding parts are marked with the same reference numerals as in Figures 1 to 7, except that the numerals are primed (''). The pin 15'' projects through a radial slot 36 in the driving disc 3'' and any suitable means may be provided for enabling the operator to move the pins readily from the low speed (dotted lines) to the high speed (full lines) position. For instance, a knob 37 may be provided on the pin 15'' and any convenient means, not shown, may be provided to lock the pin in adjusted position.

In place of the gearing 27—31 any other suitable form of reduction gearing—for instance of the epicyclic type—may be employed as will be clear to those skilled in the art.

What I claim is:—

1. A variable speed power transmitting mechanism comprising a driving shaft, a driven shaft, centrifugally operated means driven by said driving shaft, an epicyclic gear associated with the driven shaft, pivot means projecting from said planet gears, a bar supported by said pivot means, and a crank pin driven by said centrifugally operated means and in driving engagement with said bar.

2. A variable speed power transmitting mechanism, comprising a driving shaft, a driven shaft, an auxiliary shaft coaxial with said driving and driven shafts, a sun pinion mounted on said auxiliary shaft, an internally toothed ring gear coaxial with said sun pinion, planet gears meshing with said sun pinion and ring gear, pivot pins carried by said planet gears, a rigid member carried by said pins, centrifugally operable weights driven by the driving shaft and engaging said rigid member, and reduction gearing between said auxiliary shaft and said driven shaft.

3. A variable speed power transmitting mechanism comprising a driving shaft, a driven shaft, a sun pinion in driving relation to said driven shaft, an internally toothed ring gear coaxial with said sun pinion, planet gears meshing with said sun pinion and ring gear, pivot pins carried centrally by said planet gears, a bar having bores engaged by said pivot pins, centrifugally operable weights driven by said driving shaft and a crank pin driven by said weights and in driving connection with said bar.

4. A variable speed power transmitting mechanism as claimed in claim 3, wherein said bar is provided with a slot in which said crank pin engages.

5. A variable speed power transmitting mechanism as claimed in claim 3, wherein said bar is provided with a slot in which said crank pin engages, said slot being so inclined that the centrifugal action of the weights imparts to the crank pin a constant tendency to return to low speed position.

6. A variable speed power transmitting mechanism comprising a driving shaft, a driven shaft, a housing driven by said driving shaft, a housing rotatably mounted on said driven shaft, an internally toothed ring gear between said housings and carried by the second mentioned housing thus forming a closed annular gear chamber between the housings, a sun pinion in said chamber and in driving relation to the driven shaft, planet gears in said chamber and meshing with said ring gear and sun pinion, pivot members on said planet gears, a bar carried by said pivot members, centrifugally operable weights mounted in said first mentioned housing, and an eccentric crank pin carried and driven by said weights and projecting into a slot in said bar.

7. A variable speed power transmitting mechanism as claimed in claim 6, wherein said sun pinion is carried by an auxiliary shaft and a train of reduction gearing is provided between said pinion and the driven shaft.

8. A variable speed power transmitting mechanism as claimed in claim 6, wherein said sun pinion is carried by an auxiliary shaft and a train of reduction gearing is provided between said pinion and the driven shaft, and wherein the auxiliary shaft passes through a hole in the bar carried by the planet gears, there being a clearance between the auxiliary shaft and the bar.

9. A variable speed power transmitting mechanism as claimed in claim 6, wherein automatic means are provided for preventing backward rotation of the second mentioned housing when an excessive load on the driven shaft tends to cause such rotation.

10. A variable speed power transmitting mechanism as claimed in claim 6, wherein the pivot members project through slots in the first mentioned housing into bores in the bar.

11. In a variable speed power transmitting mechanism, an epicyclic gear including a sun gear, a ring gear concentric with said sun gear, and a plurality of planet gears meshing with said sun and ring gears; a rigid member carried by said planet gears; means for applying a rotational force to said rigid member, and means for varying the point of application of said rotational force to said rigid member.

LOUIS JOSEPH TURNER.